A. Foot,
Milk Cooler.
No. 85,920.
Patented Jan. 19, 1869.
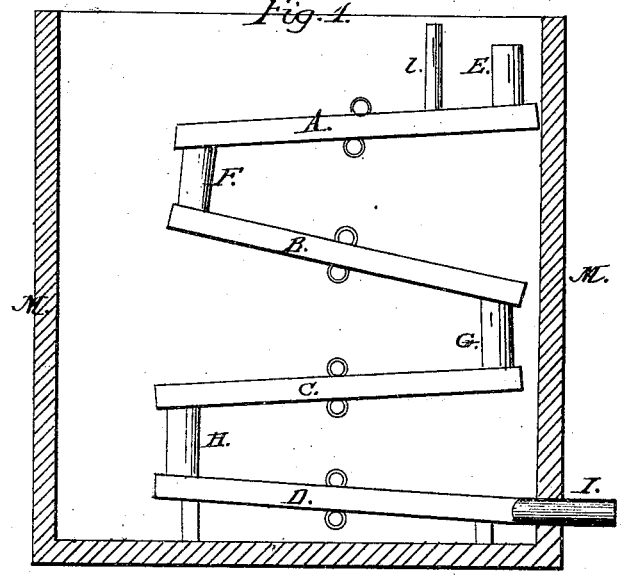
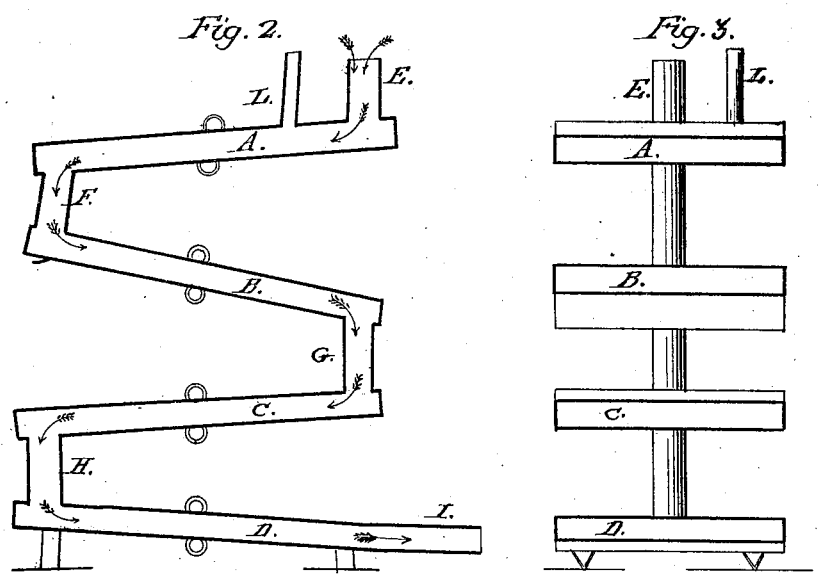
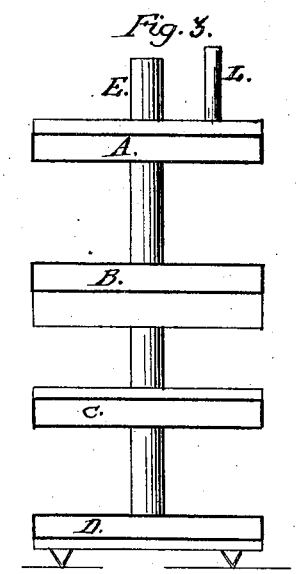
Witnesses:
John H. Shumway
A. J. Tibbitts
Inventor:
Arathar Foote
Per
John E. Earle
Attorney

ABIATHAR FOOT, OF WARREN, CONNECTICUT.

Letters Patent No. 85,920, dated January 19, 1869.

IMPROVED MILK-COOLER.

The Schedule referred to in these Letters Patent and making part of the same.

*To all whom it may concern:*

Be it known that I, ABIATHAR FOOT, of Warren, in the county of Litchfield, and State of Connecticut, have invented a new Improvement in Milk-Cooler; and I do hereby declare the following, when taken in connection with the accompanying drawings, and the letters of reference marked thereon, to be a full, clear, and exact description of the same, and which said drawings constitute part of this specification, and represent, in—

Figure 1, a side view, with a portion of the box removed to show the cooler;

Figure 2, a vertical longitudinal section; and in

Figure 3, a vertical transverse section.

The object of this invention is to cool milk in summer and warm it in winter, for the purpose of facilitating the separation of the cream from the milk; and It consists in the arrangement of several flat inclined chutes, one above the other, so that the milk poured upon the upper chute will flow over the surface, and down on to the next below, over its surface, and so on over the several chutes, until it passes off from the last. With this arrangement I combine a case, surrounding the chutes, which may be filled with warm or cold air, or water, as the case may be.

To enable others to construct and use my improvement, I will fully describe the same, as illustrated in the accompanying drawings.

A B C D are four chutes, arranged inclined one above the other, each consisting of an inclined broad, flat surface, and, by preference, the several chutes inclining less as they go toward the bottom.

On the first is arranged a mouth, E, into which the milk is poured, falling into the chute A.

The milk flows over its surface, running down the conductor F, and flowing through the chute B, thence through the conductor G to the chute C, thence through the conductor H to the last chute, D, and thence off through the outlet I.

I arrange upon the upper surface, at any convenient point, a tube, L, through which the steam which arises may pass off.

Then I place the whole within a case, M, as seen in fig. 1.

If, in summer, it is desirable to cool the milk as quickly as possible after it comes from the cow, I fill the case with cold water, made cold by artificial means, if necessary, or supply it with artificially cold air, so that the several chutes are much cooler than the atmosphere; then pour in the milk, as before described, and, passing down through the several chutes, it will become cool, in proportion as the chamber surrounding the chutes is cool.

If, in cold weather, it is desirable to warm the milk, in order to permit the separation of the cream before the milk freezes, I fill the chamber with hot water, or otherwise artificially heated, and the milk, in passing through, as before described, will be heated to a sufficient extent.

To cleanse the cooler after the milk has passed through, pour water through in the same manner as the milk was poured; and I find it advisable to "scald" the cooler, by pouring boiling water therethrough.

It will be observed that the extent of cooling depends upon the number of chutes, or upon a less inclination of the same, as, if less inclined, the milk will pass more slowly over the surface. I prefer, however, the arrangement I have shown and described.

Having fully described my invention,

What I claim as new and useful, and desire to secure by Letters Patent, is—

The arrangement, within the case M, of the several chutes, A B C D, constructed inclined, and connected so as to operate substantially as set forth.

ABIATHAR FOOT.

Witnesses:
A. J. TIBBITS,
J. H. SHUMWAY.